(12) United States Patent
Gerson-Golan et al.

(10) Patent No.: US 11,108,835 B2
(45) Date of Patent: Aug. 31, 2021

(54) ANOMALY DETECTION FOR STREAMING DATA

(71) Applicant: PAYPAL, INC., San Jose, CA (US)

(72) Inventors: Guy Gerson-Golan, Tel Aviv (IL); Uri Silberstein, Tel Aviv (IL); Yiftach Schlamm, Tel Aviv (IL)

(73) Assignee: PayPal, Inc., San Jose, CA (US)

( * ) Notice: Subject to any disclaimer, the term of this patent is extended or adjusted under 35 U.S.C. 154(b) by 31 days.

(21) Appl. No.: 16/370,249

(22) Filed: Mar. 29, 2019

(65) Prior Publication Data

US 2020/0314159 A1  Oct. 1, 2020

(51) Int. Cl.
*H04L 29/06* (2006.01)
*H04L 12/26* (2006.01)
*G06Q 30/00* (2012.01)

(52) U.S. Cl.
CPC .......... *H04L 65/4069* (2013.01); *H04L 43/08* (2013.01); *H04L 43/50* (2013.01); *G06Q 30/0185* (2013.01)

(58) Field of Classification Search
CPC ..... H04L 65/4069; H04L 43/08; H04L 43/50; G06Q 30/0185
See application file for complete search history.

(56) References Cited

U.S. PATENT DOCUMENTS

2010/0106710 A1* 4/2010 Nishizawa ........ G06F 16/24556
    707/714

2011/0301998 A1* 12/2011 Talwar ................... H04L 41/12
    705/7.26
2011/0313977 A1* 12/2011 Al-Kateb ............... G01D 21/00
    707/688

(Continued)

FOREIGN PATENT DOCUMENTS

EP    2779133 A3    12/2015

OTHER PUBLICATIONS

"A Java package to automatically detect anomalies in large scale time-series data" [online]. GitHub, Inc., 2019 [retrieved on Mar. 29, 2019]. Retrieved from the Internet: <https://github.com/yahoo/egads>.

(Continued)

*Primary Examiner* — Philip J Chea
*Assistant Examiner* — Robert B McAdams
(74) *Attorney, Agent, or Firm* — Haynes and Boone, LLP

(57) ABSTRACT

A computer system receives an input corresponding to one or more data pipeline metrics and generates a first plurality of data windows from a first portion of a plurality of streaming data, the first plurality of data windows corresponding to a first data pipeline metric. The computer system generates a first plurality of data aggregations corresponding to the first plurality of data windows, wherein generating the first plurality of data aggregations includes aggregating a data associated with each of the first plurality of windows based on the first data pipeline metric. The computer system accesses a database to determine a first set of reference data aggregations that corresponds to a first data aggregation of the first plurality of data aggregations and determines whether the first data aggregation corresponds to an anomaly based on utilizing a model to compare the first set of reference data aggregations to the first data aggregation.

20 Claims, 6 Drawing Sheets

(56) References Cited

U.S. PATENT DOCUMENTS

| | | | |
|---|---|---|---|
| 2012/0041575 A1 | 2/2012 | Maeda et al. | |
| 2014/0108640 A1* | 4/2014 | Mathis | H04L 63/1425 |
| | | | 709/224 |
| 2016/0248624 A1* | 8/2016 | Tapia | H04L 43/04 |
| 2017/0155570 A1* | 6/2017 | Maheshwari | H04L 43/50 |
| 2018/0285170 A1* | 10/2018 | Gamon | G06N 7/005 |
| 2018/0373580 A1* | 12/2018 | Ertl | G06F 11/3006 |

OTHER PUBLICATIONS

"Tool for producing high quality forecasts for time series data that has multiple seasonality with linear or non-linear growth." [online]. GitHub, Inc., 2019 [retrieved Mar. 29, 2019]. Retrieved from the Internet: <https://github.com/facebook/prophet>.

"A library for time series analysis on Apache Spark" [online]. GitHub, Inc., 2019. [retrieved Mar. 29, 2019]. Retrieved from the Internet: <https: https://github.com/sryza/spark-timeseries>.

* cited by examiner

ANOMALY DETECTION FOR STREAMING DATA

TECHNICAL FIELD

The present disclosure relates to anomaly detection, and more particularly to an effective way to perform anomaly detection for streaming data.

BACKGROUND

Early detection of abnormal events can be critical for many business applications in detecting and preventing potential instances of fraud. However, there are numerous challenges when implementing real-time anomaly models at scale, and in many cases each anomaly type, such as server failure and developer error, require significantly different anomaly detection models. Furthermore, traditional anomaly data models were designed for batch processing, and therefore, cannot be easily adapted to unbounded datasets and real-time latencies. With companies today analyzing billions of events every day in real-time across a wide range of services, devices, and locations, there is a need for anomaly detection frameworks and generic mechanisms designed for real-time anomaly detection that can be used for streaming applications.

DETAILED DESCRIPTION

Figure 1:
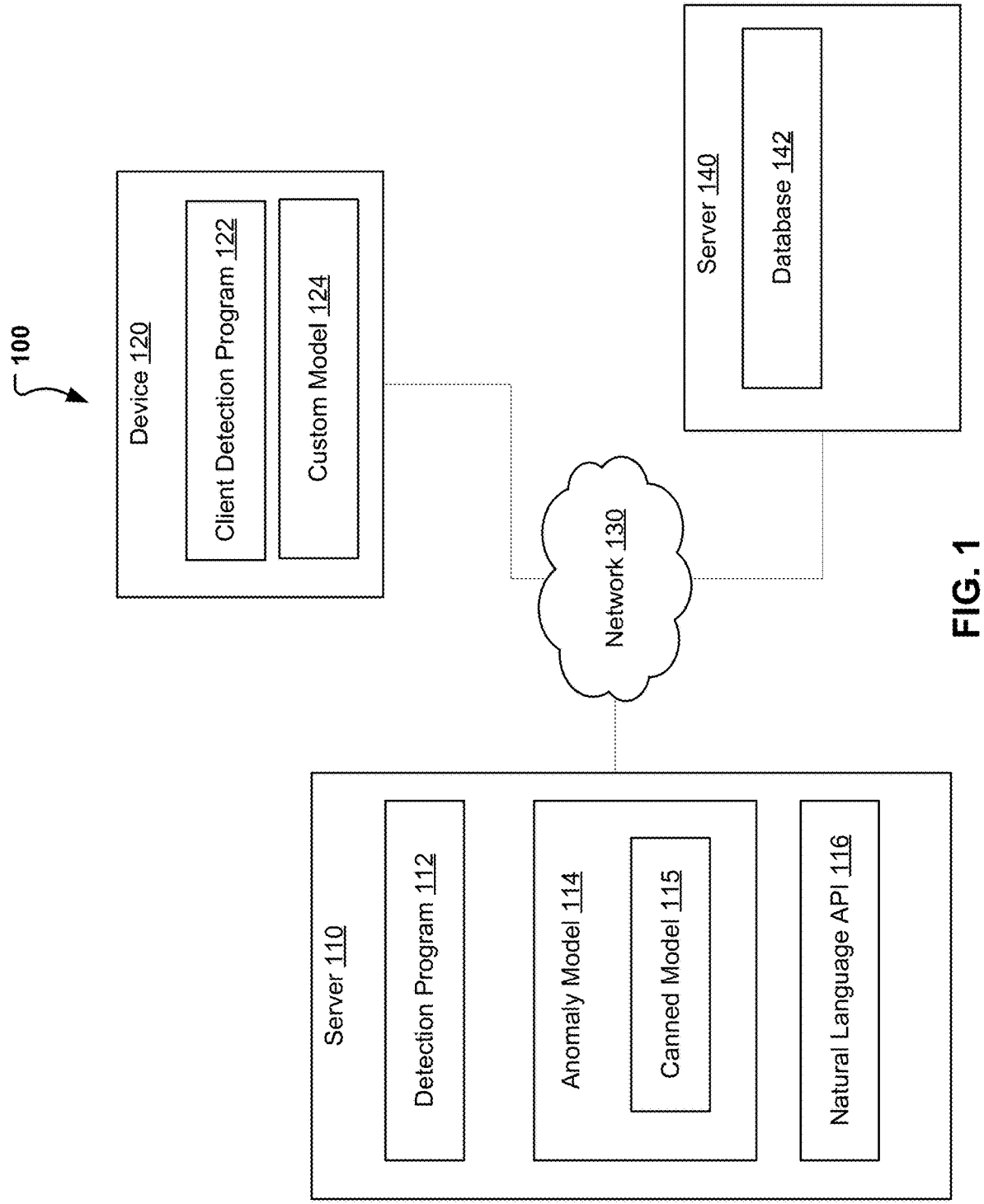
FIG. 1 illustrates an anomaly system, in accordance with an embodiment.

Embodiments of the present disclosure provide a system, method, and program product. A computer system receives an input corresponding to one or more data pipeline metrics. The computer system generates a first plurality of data windows from a first portion of a plurality of streaming data, the first plurality of data windows corresponding to a first data pipeline metric of the one or more data pipeline metrics. The computer system generates a first plurality of data aggregations corresponding to the first plurality of data windows, wherein generating the first plurality of data aggregations includes aggregating a data associated with each window of the first plurality of windows based on the first data pipeline metric. The computer system accesses a database to determine a first set of one or more reference data aggregations that corresponds to a first data aggregation of the first plurality of data aggregations. The computer system determines whether the first data aggregation corresponds to an anomaly, wherein the determining whether the first data aggregation corresponds to an anomaly is based on utilizing a model to compare the first set of one or more reference data aggregations to the first data aggregation.

The computer system receives an input corresponding to a first data pipeline metric and a second data pipeline metric, wherein the first data pipeline metric is different than the second data pipeline metric. The computer system generates a first plurality of data windows and a second plurality of data windows from a first portion of a plurality of streaming data, the first plurality of data windows corresponding to the first data pipeline metric and the second plurality of data windows corresponding to the second data pipeline metric. The computer system generates a first plurality of data aggregations corresponding to the first plurality of data windows and a second plurality of data aggregations corresponding to the second plurality of data windows, wherein generating the first plurality of data aggregations includes aggregating a data associated with each window of the first plurality of windows based on the first data pipeline metric and generating the second plurality of data aggregations includes aggregating a data associated with each window of the second plurality of data windows. The computer system accesses a database to determine a first set of one or more reference data aggregations that corresponds to a first data aggregation of the first plurality of data aggregations and a second set of one or more reference data aggregations that corresponds to a second data aggregation of the second plurality of data aggregations, wherein the first data aggregation and the second data aggregation correspond to a first sub-portion of the first portion of the plurality of streaming data. The computer system determines whether the first sub-portion corresponds to an anomaly based on determining if one or more of the first data aggregation or the second data aggregation corresponds to an anomaly, wherein the determining whether the first data aggregation corresponds to an anomaly is based on utilizing a first anomaly model and determining whether the second data aggregation corresponds to an anomaly is based on utilizing a second anomaly model.

In addition, in the example embodiment, the present disclosure describes a solution that describes a solution for utilizing a natural language API in constructing a pipeline from streaming data. In the example embodiment, present disclosure describes a framework that allows for a natural language input to be utilized to create a data pipeline from streaming data. Furthermore, the present disclosure describes a solution that allows for adjustments to be made on the fly to the data pipeline constructs and what data is captured from real-time streaming data being examined. Furthermore, the data pipeline may serve as a basis for the identification of anomalous behavior/patterns/events, via the use of the anomaly detection process described below.

Furthermore, the present disclosure describes a solution for identifying anomalous behavior/patterns/events within real-time streaming data. In the example embodiment, the present disclosure describes a solution that includes creating data windows for the data pipeline, and further aggregating the data points within each data window based on specified information. In addition, the present disclosure describes a solution for inputting the aggregations into an anomaly detection model to identify if the aggregation corresponds to an anomaly. Further, in the example embodiment, the present disclosure describes a framework for the anomaly detection process described above, which includes the creation of a data pipeline, by way of a natural language API, and further includes optionality that allows for input of custom anomaly detection models, which may be usable along with one or more canned anomaly detection methods, for the purpose of detecting an anomaly. In the example embodiment, the flexibility of the framework, by providing the optionality to utilize custom anomaly detection methods as well as canned anomaly methods, allows for a generic solution/framework that may be usable to detect a wide variety of anomaly types. The solution is described in further detail below.

Embodiments of the present disclosure will now be described in detail with reference to the accompanying Figures.

FIG. 1 illustrates anomaly system 100, in accordance with an embodiment. In the example embodiment, anomaly system 100 includes server 110, device 120, and server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between server 110 and server 140.

In the example embodiment, device 120 includes client detection program 122 and custom model 124. In the example embodiment, device 120 may be a desktop computer, a laptop computer, a tablet computer, a mobile device, a handheld device, a thin client, or any other electronic device or computing system capable of receiving and sending data to and from other computing devices, such as server 110, via network 130. Although not shown, optionally, device 120 can comprise a cluster of servers executing the same software to collectively process requests as distributed by a front-end server and a load balancer. In the example embodiment, device 120 may be a client-side device, such as a merchant device or user device, that is usable for accessing a server-side API and server-side anomaly detection models. Device 120 is described in more detail with regard to the figures.

In the example embodiment, client detection program 122 is a client-side application capable of communicating with the server-side detection program 112. Furthermore, in the example embodiment, client detection program 122 may include or utilize a client-side API in order to access a server-side API, such as natural language API 116. Client detection program 122 is described in further detail with regard to the figures.

In the example embodiment, custom model 124 is a client anomaly detection model or custom anomaly detection logic created by the user of device 120. Information corresponding to custom model 124 may be transmitted to server 110, via network 130, and utilized by server-side models, such as anomaly model 114. Custom model 124 is explained in further detail with regard to the figures.

In the example embodiment, server 140 includes database 142. In the example embodiment, server 140 may be a desktop computer, a laptop computer, a tablet computer, a mobile device, a handheld device, a thin client, or any other electronic device or computing system capable of receiving and sending data to and from other computing devices, such as server 110, via network 130. Furthermore, in the example embodiment, server 140 is a computing device that is optimized for the support of databases that reside on server 140, such as database 142, and for the support of network requests related to database 142. Although not shown, optionally, server 140 can comprise a cluster of servers executing the same software to collectively process requests as distributed by a front-end server and a load balancer. Server 140 is described in more detail with regard to figures.

In the example embodiment, database 142 is a database that may include stored data windows, data aggregations, and detected anomalies corresponding to the data aggregations or data windows. Furthermore, in one or more embodiments, database 142 may include all datapoints that have been analyzed by anomaly model 114, and further may include additional information corresponding to the analysis conducted (such as whether or not an anomaly was detected). In certain embodiments, analyzed datapoints may be stored in the form of data aggregations or data windows. Furthermore, in certain embodiments, a sampling method may be utilized to identify a sub group of datapoints that are representative of a particular data window(s) and/or data aggregation(s), with these sub groups of data points being stored in database 142 (along with additional information corresponding to the anomaly analysis conducted by anomaly model 114). Database 142 is described in further detail with regard to the figures.

In the example embodiment, server 110 includes detection program 112, anomaly 114, and natural language API 116. In the example embodiment, server 110 may be a desktop computer, a laptop computer, a tablet computer, a mobile device, a handheld device, a thin client, or any other electronic device or computing system capable of receiving and sending data to and from other computing devices, such as server 140, via network 130. Furthermore, in the example embodiment, server 110 is a computing device that is optimized for the support of programs that reside on server 110, such as detection program 112, anomaly model 114, and natural language API 116. Although not shown, optionally, server 110 can comprise a cluster of servers executing the same software to collectively process requests as distributed by a front-end server and a load balancer. Server 110 is described in more detail with regard to figures.

In the example embodiment, natural language API 116 is a server-side API that is capable of accepting natural language input and further interfacing with detection program 112 in order to create a data pipeline that corresponds to the input, from real-time streaming data. Furthermore, natural language API 116 is capable of interfacing with client-side programs such as client detection program 122. Natural language API 116 is described in further detail with regard to the figures.

In the example embodiment, anomaly model 114 includes canned model 115. In the example embodiment, anomaly model is an anomaly detection model that is capable of utilizing one or more canned anomaly detection methods, such as canned model 115, as well as one or more custom models, such as custom model 124, in determining if an anomaly has been detected in a dataset. Furthermore, in the example embodiment, anomaly detection model 114 is capable of determining if a current dataset corresponds to an anomaly based on using one or more methodologies to compare the current dataset to an identified reference dataset, such as a reference data aggregation or reference data window stored in database 142. Anomaly model 114 and canned model 115 are described in further detail with regard to the figures.

Detection program 112 is a software application that is capable of creating one or more data windows from a set of real-time streaming data, and further detection program 112 is capable of creating one or more data aggregations for each of the data windows based on pipeline input received via natural language API 116. Furthermore, in the example embodiment, detection program 112 is capable of identifying a reference data aggregation/data window that corresponds to a current data aggregation or data window being analyzed. In addition, detection program 112 is capable of utilizing anomaly model 114 in determining if an anomaly has been detected for a particular data aggregation or data window, and based on the determination, is capable of taking one or more remedial steps, such as generating a report or alert corresponding to the detected anomaly. Detection program 112 is described in further detail with regard to the figures.

Furthermore, in one or more embodiments, detection program 112 may utilize one or more application programming interfaces (API) in communicating with anomaly model 114, and further in communicating with database 142.

Figure 2:
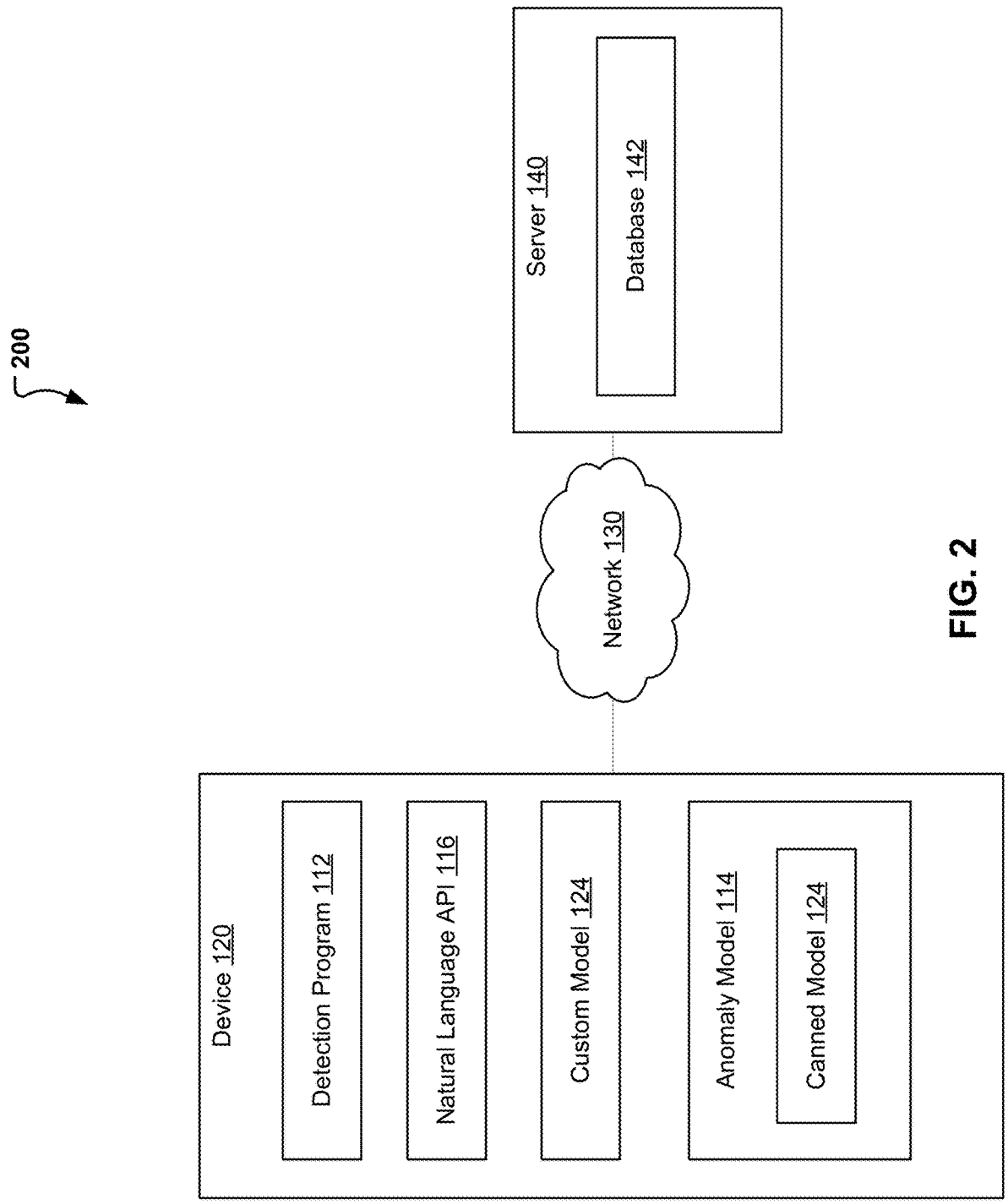
FIG. 2 illustrates an alternative embodiment of the anomaly system of FIG. 1, in accordance with an embodiment.

FIG. 2 illustrates an alternative embodiment of anomaly system 100, in accordance with an embodiment. In the example embodiment, anomaly system 200 includes device 120 and server 140 interconnected via network 130. In the example embodiment, anomaly system 200 illustrates an embodiment where natural language API 116, detection program 112, and anomaly model 114 are located on device 120, and can be accessed directly by the user of device 120 (rather than via a client program as described in FIG. 1). Anomaly system 200 may represent a system used by a merchant to identify anomalies with regard to streaming data points, such as transactions, associated with the merchant.

On other hand, anomaly system 100 may represent a system that allows a client (such as a merchant) to access a third-party API and a third-party anomaly detection model in order to identify anomalies within a streaming dataset.

Figure 3:
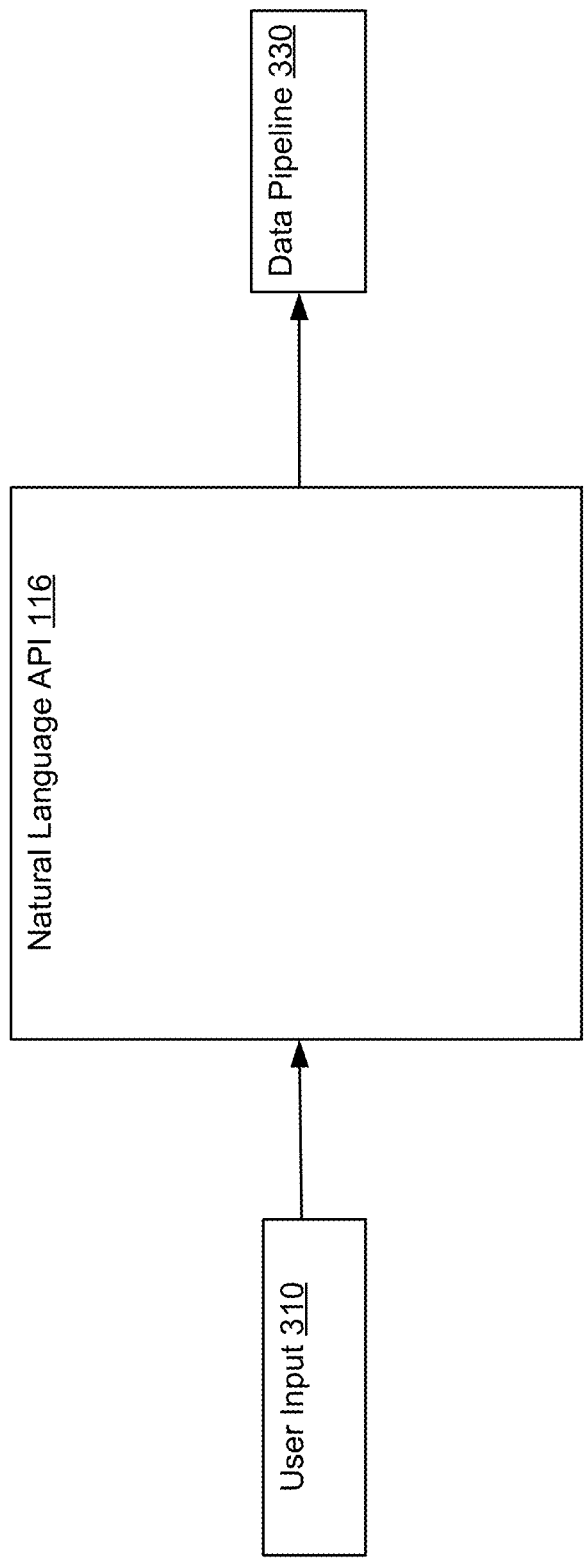
FIG. 3 is a data flow diagram illustrating the utilization of the natural language application programming interface (API) of FIGS. 1 and 2 in constructing a data pipeline, in accordance with an embodiment.

FIG. 3 is a data flow diagram illustrating the utilization of natural language API 116 in constructing a data pipeline, in accordance with an embodiment. In the example embodiment, as described above, natural language API is capable of receiving a natural language input, such as user input 310, and based on the natural language input being received via natural language API 116, detection program 118 analyzes the received input, i.e. user input 310, and determines a data pipeline, data pipeline 330, from a larger stream of real-time data. For example, if user input 310 indicates a desire to build a data pipeline corresponding to user logins into a service provider account by country, detection program 118 may analyze the real-time streaming data and create data windows corresponding to specific time periods (such as for each hour), which may contain each contain a plurality of data points. Detection program 118 may further transform each data window into a data aggregation by grouping the data points within each data window based on country. In the example embodiment, these data aggregations may represent the constructed data pipeline.

In another example, the user input 310 may additionally indicate a desire to build a data pipeline corresponding to user logins into a service provider account by country with smaller data windows (every 30 minutes rather than every hour). In this example, detection program 118 may analyze the real-time streaming data and create data windows corresponding to specific time periods (i.e., data window constructed for each 30 minute time period). Detection program 118 may further transform each data window into a data aggregation by grouping the data points within each data window based on country. As stated above, these data aggregations may represent the constructed data pipeline.

Furthermore, different or additional parameters may be input into natural language API 116 in order to construct a desired data pipeline.

Figure 4:
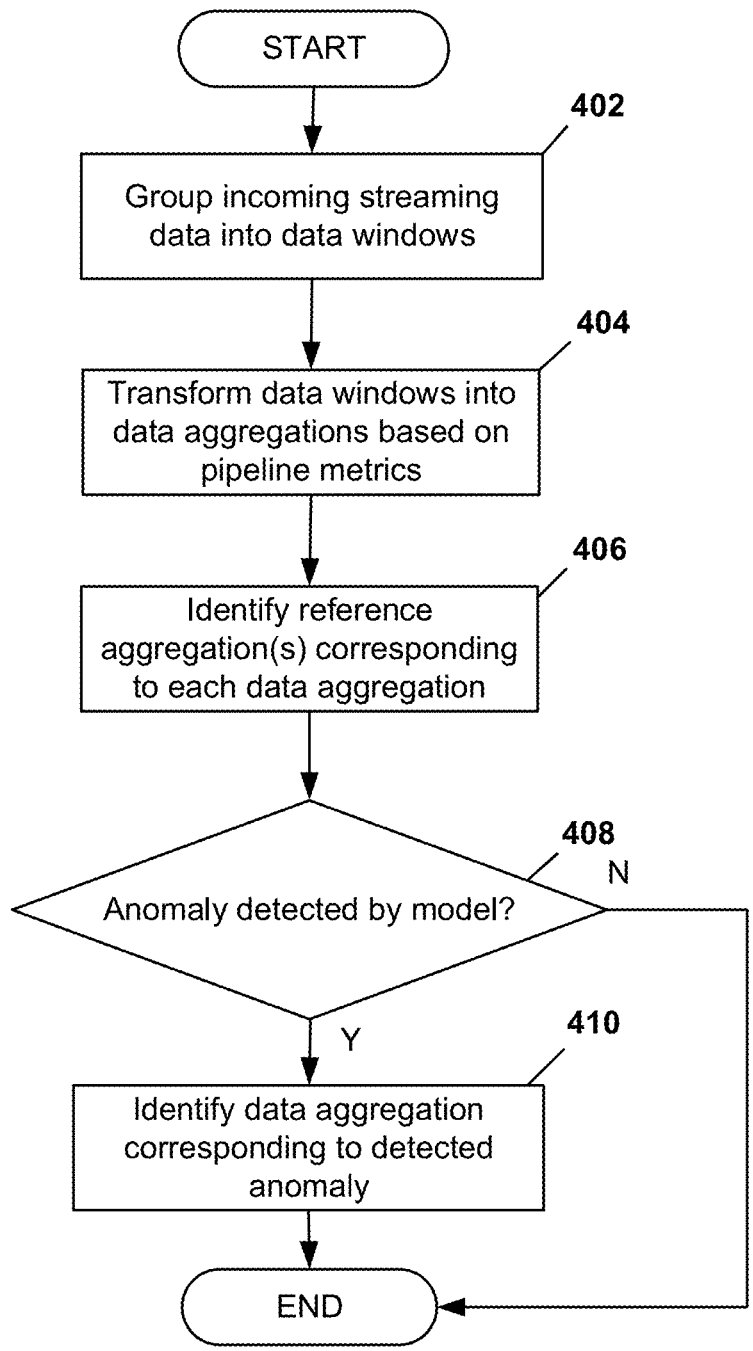
FIG. 4 is a flowchart illustrating the operations of the detection program of FIGS. 1 and 2 in identifying whether or not an anomaly has been detected for a stream of real-time data, in accordance with an embodiment.

FIG. 4 is a flowchart illustrating the operations of detection program 112 in identifying whether or not an anomaly has been detected for a stream of real-time data, in accordance with an embodiment. In the example embodiment, as stated above, detection program 112 may receive user input corresponding to the construction of a data pipeline from a larger stream of real-time data. For example, a merchant may wish to construct a data pipeline from a stream of real-time data corresponding to user logins or user transactions, that details user logins based on age (and therefore, may provide input via natural language API 116 that indicates age as a pipeline metric).

In the example embodiment, detection program 112 may receive the input via natural language API 116, and further may construct one or more data windows from the stream of real-time data (step 402). In the example embodiment, detection program 112 creates one or more data window based on specified time intervals. In other words, detection program 112 may analyze time stamps associated with each data point and then create data windows corresponding to a specific time interval, which may be specified by the input received via natural language API 116 or may be input by an administrator of server 110 (i.e., an administrator managing the device that contains detection program 112 and anomaly model 114). For example, for a real-time stream of transaction data, detection program 112 may analyze each transaction based on an associated time stamp and group the transactions into 30 min data windows.

In the example embodiment, detection program 112 may then transform each data window into a data aggregation (or create a data aggregation corresponding to each data window) (step 404). In the example embodiment, detection program 112 utilizes the pipeline metric input received via natural language API 116 in order to determine how to aggregate the data corresponding to each data window. For example, if the input provided indicates a desire to build a data pipeline corresponding to user logins into a service provider account by country, detection program 112 may transform each data window into a data aggregation by grouping the data within each data window based on the country of the user login. Therefore, a first data aggregation may have a plurality of data corresponding to a 30 min interval with each data point based on the country of login (i.e., 5 data points corresponding to country A may be grouped together, 7 data points corresponding to country B may be grouped together, etc.).

In the example embodiment, detection program 112 may then identify one or more reference data aggregations that correspond to each created data aggregation (step 406). In the example embodiment, detection program 112 may access database 142 in order to identify one or more historical data aggregations that correspond to each of created data aggregations. In the example embodiment, historical data aggregations may be identified based on the time interval associated with each created data aggregation. For example, for a data aggregation corresponding to a time window of 2 pm to 3 pm, detection program 112 may identify one or more reference data aggregations corresponding to the time window of 2 pm to 3 pm. In addition, further temporal factors may be taken into account, for example, detection program 112 may also identify the day of the week, the date, and also consider whether the date corresponds to a holiday or holiday period. Therefore, with regard to this example, detection program 112 may identify reference data aggregations that correspond to the time window of 2 pm to 3 pm and further correspond to additional temporal factors such as a specific day of the week, a specific date, or a specific holiday/holiday time period. In other embodiments, detection program 112 may utilize an amount of data aggregations that temporally preceded the created data aggregation as the reference data aggregations for the created data aggregation. For example, for the analysis of a first data aggregation, detection program 112 may utilize the 10 data aggregations that temporally preceded the first data aggregation as reference data aggregations.

In the example embodiment, detection program 112 may provide anomaly model 114 with an input that includes each created data aggregation in association with the identified reference aggregation(s). Anomaly model 114 may then analyze the created data aggregations in view of the corresponding reference aggregations in order to determine if an anomaly has been detected with respect to each created data aggregation (decision 408). In the example embodiment, in determining if an anomaly exists with regard to a created data aggregation, anomaly model 114 may utilize one or more canned models 115 and/or utilize one or more custom models 124. In other words, the framework of anomaly model 114 not only allows for the use of canned detection methods (that may be input by a system administrator) but also allows for custom detection methods that a user, such as merchant, may want to utilize with respect to all or some of the created data aggregations that are analyzed by anomaly model 114 to be plugged in. In the example embodiment, input may be provided via natural language API 116 as to which type of algorithm or anomaly detection method that a user, such as the user of device 120, would like to utilize in performing the anomaly detections. Furthermore, the input may provide additional information that details that a first anomaly detection method is to be utilized for a first type of data aggregation, while a second anomaly detection method is to be utilized for a second type of data aggregation. For example, with regard to a stream of real-time data corresponding to user logins, if input is provided via natural language API 116 that a user wishes to construct a first data pipeline based on the age of the users corresponding to the user log-ins and a second data pipeline based on the gender of the users corresponding to the user log-ins, the input may also specify an anomaly detection method to be utilized with respect to each data pipeline (and corresponding data aggregations). In other embodiments, detection program 112 may, without user input, determine to utilize the first anomaly detection method for analyzing the first data aggregation based on identifying that the first anomaly detection method corresponds to a data pipeline metric associated with the first data aggregation. For example, if the first data aggregation corresponds to the age of the users corresponding to the user log-ins, detection program 112 may reference a database and determine that the first anomaly detection method is appropriate for analyzing an age-related metric. This example is explained in further detail with regard to FIG. 5.

In other embodiments, anomaly model 114 may utilize multiple anomaly detection method and the existence of an anomaly may be based on the aggregate of the multiple methods utilized. For example, in one embodiment, anomaly model 114 may utilize a first and a second detection method in analyzing a first created data aggregation, and if at least one of the two detection methods signal that an anomaly has been detected, anomaly model 114 may determine that an anomaly exists with regard to the first created data aggregation. In another embodiment, anomaly model 114 may utilize the first and the second detection method in analyzing the first created data aggregation but require that both detection methods signal that an anomaly has been detected in order to determine that an anomaly exists with regard to the first created data aggregation. Therefore, with regard to this embodiment, if either the first anomaly detection method or the second anomaly detection method does not signal that an anomaly has been detected, detection program 112 may determine that the first created data aggregation does not correspond to an anomaly.

Examples of anomaly detection methods that may be utilized include z-score, entropy, DBSCAN, HDBSCAN, Fast Fourier transform, Holt-winters forecasting, and additional detection methods.

If anomaly model 114 determines that an anomaly has not been detected with respect to a data aggregation (decision 408, "NO branch"), anomaly model 114 continues to the next created data aggregation and analyzes the created data aggregation in view of the corresponding reference aggregation(s). Furthermore, in the example embodiment, after a created data aggregation is analyzed by anomaly model 114, detection program 112 immediately stores the already analyzed data aggregation in database 142 for use as a reference data aggregation with regard to future created data aggregations. In addition, detection program 112 may store information regarding the anomaly analysis conducted by anomaly model 114 in correlation with the data aggregation. In other embodiments, detection program 112 may utilize sampling methods (such as reservoir sampling) to identify a sub-set of data that is representative of each analyzed data aggregation and may then store the sub-set of data to allow for reference data to be stored in database 142, while minimizing the necessary storage resources. Furthermore, in one or more embodiments, detection program 112 may store each analyzed data aggregation or a sub-set of data that is representative of the analyzed data aggregation in association with one or more similar datasets (such as similar reference data aggregations or sub-sets that are representative of one or more similar data aggregations).

If anomaly model 114 determines that an anomaly has been detected with respect to a data aggregation (decision 408, "YES branch"), detection program 112 may identify the data aggregation corresponding to the detected anomaly by creating an alert or providing a report to a user, such as the user of device 120 (step 410). In the example embodiment, detection program 112 may transmit the alert/report to client detection program 122, via network 130, so that the alert/report is provided and accessible via a user interface of device 120. Furthermore, in the example embodiment, the alert or report may include information the details a cause of the anomaly and/or may include the analysis conducted to identify the anomaly within the data aggregation. Detection program 112 may then store the analyzed data aggregation in database 142 (along with anomaly analysis information) as stated above.

While in the example embodiment, the process described above is used for detecting anomalies within real-time streaming data, in other embodiments, the process and the framework described above may also be used for batch processing and anomaly detection within batches of data.

Figure 5:
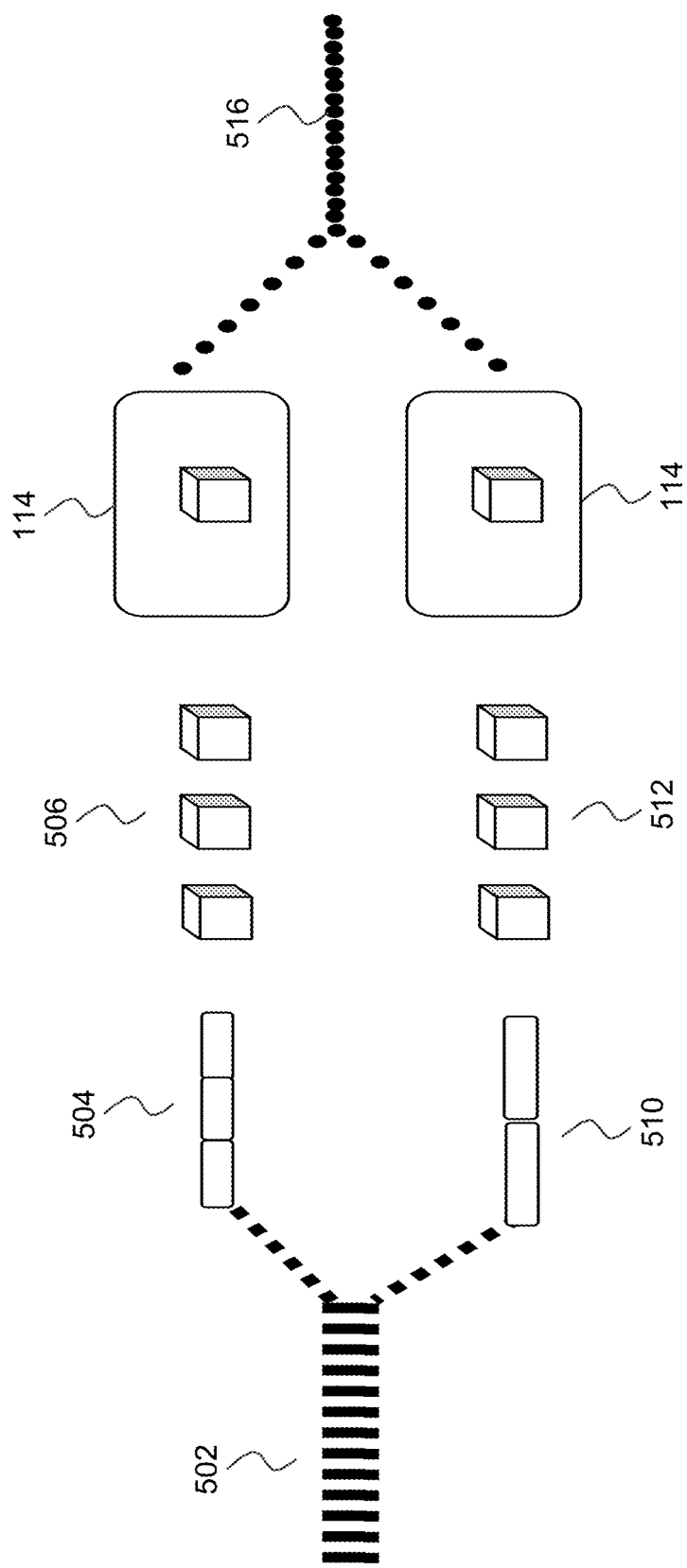
FIG. 5 is a data flow diagram illustrating an anomaly detection process, in accordance with an embodiment.

FIG. 5 is a data flow diagram illustrating an anomaly detection process, in accordance with an embodiment. In the example embodiment, a user of device 120, such as a merchant may wish to utilize one or more different metrics in order to analyze whether or not a streaming dataset contains an anomaly. In other words, a user of device 120 may input multiple data pipeline metrics into natural language API 116, which may result in detection program 112 creating two anomaly detection flows as depicted in FIG. 5. With respect to FIG. 5, streaming data 502 represents incoming streaming data, which based on input received corresponding to two pipeline metrics, results in two anomaly detection flows. Data windows 504 represent data windows corresponding to a first anomaly detection flow and data windows 510 represent data windows corresponding to a second anomaly detection flow. Furthermore, data aggregations 506 represents data aggregations corresponding to the first anomaly detection flow, while data aggregations 512 represents data aggregations corresponding to the second anomaly detection flow. Each respective flow of data aggregations may be input into anomaly model 114 where each data aggregation is analyzed for anomalous activity. In the example embodiment, since each anomaly detection flow corresponds with a different pipeline metric(s), anomaly model 114 may utilize a first anomaly detection method for the first anomaly detection flow and a second anomaly detection method for the second anomaly detection flow.

For example, with regard to a real-time streaming dataset of user logins into a service provider, the user of device 120 may input, via natural language API 116, that he/she wishes to construct a pipeline (and perform an anomaly detection analysis) with regard to a first pipeline metric, a gender of a user with respect to the user logins, and a second pipeline metric, an age of a user with respect to the user logins. Therefore, based on this input, detection program 112 may analyze streaming data 502 and construct a first anomaly detection flow for the gender of the users and a second anomaly detection flow for the age of the users. In other words, each user login may be analyzed by detection program 112 and a gender corresponding to the user associated with the login may be determined and an age corresponding to the user associated with the login may be determined. Detection program 112 may then take the gender data points and create data windows 504 and the age data points and create data windows 510. In certain embodiments, the entire portion of the original data point (the user login) may be maintained with regard to each respective set of data windows, however, with respect to this example, the relevant information (age/gender) may be extracted and an identifier corresponding to the original data point (user login) may be utilized to connect the extracted information to the original data point.

Furthermore, data windows 504 and data windows 510 may correspond to different time periods (as shown in FIG. 5), or in other embodiments, may correspond to the same time period. Therefore, data windows 504 may correspond to a 30 minute time period while data windows 510 may correspond to a 20 minute time period. Detection program 112 may then transform the data windows into data aggregations. With regard to the example, detection program 112 may transform data windows 504 into data aggregations 506, and data windows 510 into data aggregations 512. As stated above, in transforming the data windows into data aggregations, detection program 112 takes the associated pipeline metric into account. Therefore, with regard to data aggregations 506, detection program 112 may aggregate all the male gender data points and all the female gender data points with respect to each data aggregation of data aggregations 506. In other words, a first data aggregation may have 3200 male data points and 4000 female data points (i.e., 3200 male user logins and 4000 female user logins). Detection program 112 may then input each stream of data aggregations into anomaly model 114. As stated above, a different anomaly detection method may be utilized based on the defined pipeline metric. Therefore, with regard to data aggregations 506 which corresponds to a gender based metric, an entropy based anomaly detection model may be utilized, while for data aggregations 512, a z-score anomaly detection model may be utilized. In the example embodiment, detection program 112 may reference a database which contains specific anomaly detection methods that correspond to certain pipeline metrics or the specific anomaly detection method may be input by the user of device 120 via natural language API 116. After anomaly model 114 analyzes the data aggregations, the results are reported, and anomalies, such as anomaly 516 may be flagged by anomaly model 114 and/or detection program 112. In other words, with regard to this example, detection program 112 may determine if a portion of data (portion of the streaming data) corresponds to an anomaly based on analyzing the portion of data with respect to a gender based analysis (data aggregations 506) and an age-related analysis (data aggregations 512) as described above, and based on detection program 112 determining that one or more of data aggregations 506 or 512 correspond to an anomaly, detection program 112 may determine that the portion of data corresponds to an anomaly. In other embodiments, detection program 112 may require that both data aggregations 506 and 512 correspond to an anomaly in order to determine that the first portion of data corresponds to an anomaly.

While in the example provided, each data point in streaming data 502 is analyzed from the perspective of two anomaly detection flows, in other embodiments, each data point in streaming data 502 may be analyzed from the perspective of another plurality of anomaly detection flows or from the perspective of a singular anomaly detection flow. In the example embodiment, the number of anomaly detection flows may be determined based on the data pipeline metric input provided by the user of device 120 and/or based on canned anomaly detection methods that may be selected by the user of device 120 (or in some embodiments, may always be taken into account when performing anomaly detection).

In other embodiments, a first plurality of data points in streaming data 502 may be analyzed based on a first anomaly detection method (and therefore placed into a first anomaly detection flow) and a second plurality of data points in streaming data 502 may be analyzed based on a second anomaly detection method (and therefore placed into a second anomaly detection flow). In these other embodiments, the determination as to which anomaly detection flow to place a data point of streaming data 502 may be determined based on one or more attributes of the data point. For example, for a data point corresponding to a user login, detection program 112 may analyze one or more attributes of the user login (an age, country, time stamp, account characteristics, etc.) to determine the appropriate anomaly detection flow to place the data point. In further embodiments, the anomaly detection flow to place a data point of streaming data 502 may be determined at random.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 6:
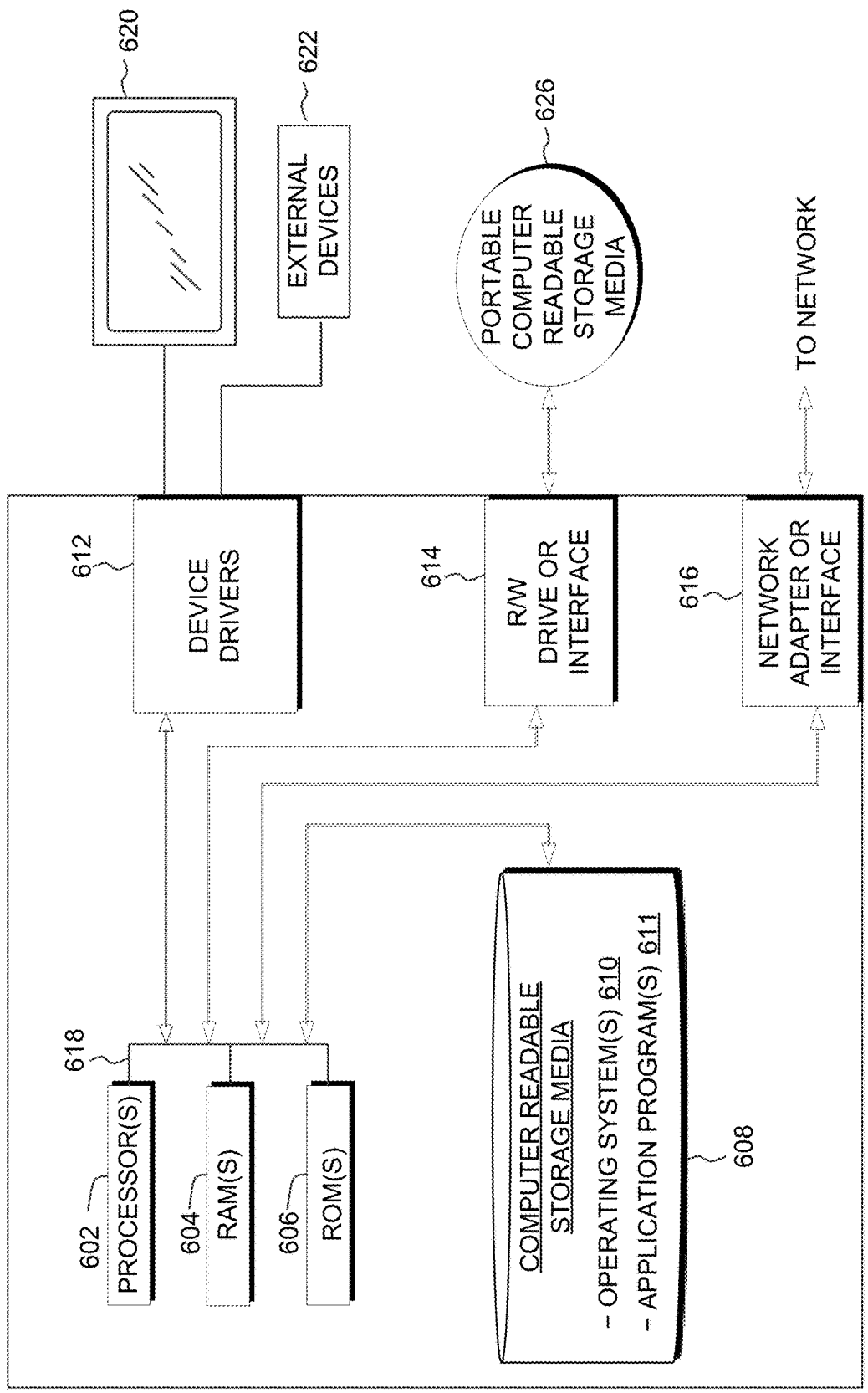
FIG. 6 is a block diagram depicting the hardware components of the anomaly system of FIGS. 1 and 2, in accordance with an embodiment.

FIG. 6 depicts a block diagram of components of computing devices contained in anomaly system 100 of FIG. 1 and anomaly system 200 of FIG. 2, in accordance with an embodiment. It should be appreciated that FIG. 6 provides only an illustration of one implementation and does not imply any limitations with regard to the environments in which different embodiments may be implemented. Many modifications to the depicted environment may be made.

Computing devices may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, detection program 112, are stored on one or more of the computer readable storage media 608 for execution by one or more of the processors 602 and by utilizing one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 614 to read from and write to one or more portable computer readable storage media 626. Application programs 611 on the computing devices may be stored on one or more of the portable computer readable storage media 626, read via the respective R/W drive or interface 614 and loaded into the respective computer readable storage media 608.

Computing devices may also include a network adapter or interface 616, such as a TCP/IP adapter card or wireless communication adapter (such as a 4G wireless communication adapter using OFDMA technology). Application programs 611 on the computing devices may be downloaded to the computing devices from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing devices may also include a display screen 620, and external devices 622, which may include, for example a keyboard, a computer mouse and/or touchpad. Device drivers 612 interface to display screen 620 for imaging, to external devices 622, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
   one or more computer-readable memories storing program instructions; and
   one or more processors configured to execute the program instructions to cause the computer system to perform operations comprising:
      receiving an input corresponding to one or more data pipeline metrics;
      generating a first plurality of data windows from a first portion of a plurality of streaming data, the first plurality of data windows corresponding to a first data pipeline metric of the one or more data pipeline metrics;
      generating a first plurality of data aggregations corresponding to the first plurality of data windows, each data aggregation of the first plurality of data aggregations comprising a plurality of data points, wherein generating the first plurality of data aggregations includes aggregating data associated with each data window of the first plurality of data windows based on the first data pipeline metric;
      accessing a database to determine a first set of one or more reference data aggregations that corresponds to a first data aggregation of the first plurality of data aggregations based on a time interval and one or more additional temporal factors associated with the first data aggregation;
      determining whether the first data aggregation corresponds to an anomaly, wherein the determining whether the first data aggregation corresponds to the anomaly is based on utilizing a model to compare the first set of one or more reference data aggregations to the first data aggregation; and
      storing, in the database, a first sampled data aggregation comprising a subset of the plurality of data points of the first data aggregation, wherein the subset includes fewer data points than the first plurality of data points.

2. The computer system of claim 1, the operations further comprising:
   generating a second plurality of data windows from the first portion of the plurality of streaming data, the second plurality of data windows corresponding to a second data pipeline metric of the one or more data pipeline metrics, wherein the second data pipeline metric is different than the first data pipeline metric;
   generating a second plurality of data aggregations corresponding to the second plurality of data windows, wherein generating the second plurality of data aggregations includes aggregating data associated with each data window of the second plurality of data windows based on the second data pipeline metric;
   accessing a database to determine a second set of one or more reference data aggregations that corresponds to a second data aggregation of the second plurality of data aggregations; and
   determining whether the second data aggregation corresponds to the anomaly or a different anomaly, wherein the determining whether the second data aggregation corresponds to the anomaly or a different anomaly is based on utilizing the model to compare the second set of one or more reference data aggregations to the second data aggregation.

3. The computer system of claim 2, wherein the first data aggregation and the second data aggregation correspond to a first sub-portion of the first portion of the plurality of streaming data.

4. The computer system of claim 3, the operations further comprising:
determining that the first data aggregation corresponds to the anomaly and based on determining that the first data aggregation corresponds to the anomaly, determining that the first sub-portion of the first portion of the plurality of streaming data corresponds to the anomaly.

5. The computer system of claim 4, the operations further comprising:
determining that the second data aggregation does not correspond to the anomaly or a different anomaly.

6. The computer system of claim 1, the operations further comprising:
in response to determining that the first data aggregation corresponds to the anomaly, causing an indication of the anomaly corresponding to the first data aggregation to be provided to a user via a user interface.

7. The computer system of claim 1, wherein the one or more data pipeline metrics includes one or more user characteristics or a location associated with each data of the plurality of streaming data.

8. A non-transitory computer-readable medium storing computer-executable instructions, that in response to execution by one or more hardware processors, causes the one or more hardware processors to perform operations comprising:
receiving an input corresponding to one or more data pipeline metrics;
generating a first plurality of data windows from a first portion of a plurality of streaming data, the first plurality of data windows corresponding to a first data pipeline metric of the one or more data pipeline metrics;
generating a first plurality of data aggregations corresponding to the first plurality of data windows, wherein generating the first plurality of data aggregations includes aggregating data associated with each data window of the first plurality of data windows based on the first data pipeline metric;
accessing a database to determine a first set of one or more reference data aggregations that corresponds to a first data aggregation of the first plurality of data aggregations based on a time interval and one or more additional temporal factors associated with the first data aggregation; and
determining whether the first data aggregation corresponds to an anomaly, wherein the determining whether the first data aggregation corresponds to the anomaly is based on utilizing a model to compare the first set of one or more reference data aggregations to the first data aggregation.

9. The non-transitory computer-readable medium of claim 8, the operations further comprising:
generating a second plurality of data windows from the first portion of the plurality of streaming data, the second plurality of data windows corresponding to a second data pipeline metric of the one or more data pipeline metrics, wherein the second data pipeline metric is different than the first data pipeline metric;
generating a second plurality of data aggregations corresponding to the second plurality of data windows, wherein generating the second plurality of data aggregations includes aggregating data associated with each data window of the second plurality of data windows based on the second data pipeline metric;
accessing a database to determine a second set of one or more reference data aggregations that corresponds to a second data aggregation of the second plurality of data aggregations; and
determining whether the second data aggregation corresponds to the anomaly or a different anomaly, wherein the determining whether the second data aggregation corresponds to the anomaly or a different anomaly is based on utilizing the model to compare the second set of one or more reference data aggregations to the second data aggregation.

10. The non-transitory computer-readable medium of claim 9, wherein the first data aggregation and the second data aggregation correspond to a first sub-portion of the first portion of the plurality of streaming data.

11. The non-transitory computer-readable medium of claim 10, the operations further comprising:
determining that the first data aggregation corresponds to the anomaly and based on determining that the first data aggregation corresponds to the anomaly, determining that the first sub-portion of the first portion of the plurality of streaming data corresponds to the anomaly.

12. The non-transitory computer-readable medium of claim 11, the operations further comprising:
determining that the second data aggregation does not correspond to the anomaly or a different anomaly.

13. The non-transitory computer-readable medium of claim 8, the operations further comprising:
determining to utilize the model for the first data aggregation based on identifying that the model corresponds to the first data pipeline metric.

14. The non-transitory computer-readable medium of claim 8, wherein the one or more data pipeline metrics includes one or more user characteristics.

15. A method, comprising:
receiving, by a computer system, an input corresponding to a first data pipeline metric and a second data pipeline metric, wherein the first data pipeline metric is different than the second data pipeline metric;
generating, by the computer system, a first plurality of data windows and a second plurality of data windows from a first portion of a plurality of streaming data, the first plurality of data windows corresponding to the first data pipeline metric and the second plurality of data windows corresponding to the second data pipeline metric;
generating, by the computer system, a first plurality of data aggregations corresponding to the first plurality of data windows, and a second plurality of data aggregations corresponding to the second plurality of data windows, wherein generating the first plurality of data aggregations includes aggregating data associated with each data window of the first plurality of data windows based on the first data pipeline metric and generating the second plurality of data aggregations includes aggregating data associated with each window of the second plurality of data windows;
accessing, by the computer system, a database to determine a first set of one or more reference data aggregations that corresponds to a first data aggregation of the first plurality of data aggregations and a second set of one or more reference data aggregations that corresponds to a second data aggregation of the second plurality of data aggregations, wherein the first data aggregation and the second data aggregation correspond to a first sub-portion of the first portion of the plurality of streaming data; and determining, by the computer system whether the first sub-portion corresponds to an anomaly based on determining if one or more of the first data aggregation or the second data aggregation corresponds to the anomaly or a different anomaly, wherein the determining whether the first data aggregation corresponds to the anomaly is based on utilizing a first anomaly model and determining whether the second data aggregation corresponds to the anomaly or a different anomaly is based on utilizing a second anomaly model.

16. The method of claim 15, further comprising:
in response to determining that the first sub-portion corresponds to the anomaly, causing an indication of the anomaly corresponding to the first sub-portion to be provided to a user via a user interface.

17. The method of claim 15, further comprising:
storing the first data aggregation in the database in association with the first set of the one or more reference data aggregations.

18. The method of claim 15, further comprising determining to utilize the first anomaly model for the first data aggregation based on identifying that the first anomaly model corresponds to the first data pipeline metric.

19. The method of claim 15, wherein the input corresponding to the first data pipeline metric and the second data pipeline metric is received via a natural language application programming interface (API).

20. The method of claim 15, wherein the first data pipeline metric is a user characteristic or a location associated with each data of the plurality of streaming data.

* * * * *